(12) United States Patent
Itaya et al.

(10) Patent No.: US 10,058,841 B2
(45) Date of Patent: *Aug. 28, 2018

(54) DOLOMITE-BASED HEAVY METAL ADSORBENT, PREPARATION, AND USE FOR ADSORBING HEAVY METAL, HALOGEN AND METALLOID

(71) Applicant: Sumitomo Osaka Cement Co., Ltd., Tokyo (JP)

(72) Inventors: Yuuki Itaya, Tokyo (JP); Kenji Kuninishi, Tokyo (JP); Shintaro Hayashi, Tokyo (JP)

(73) Assignee: SUMITOMO OSAKA CEMENT CO., LTD., Chiyoda-Ku, Tokyo (JP)

(*) Notice: Subject to any disclaimer, the term of this patent is extended or adjusted under 35 U.S.C. 154(b) by 72 days.

This patent is subject to a terminal disclaimer.

(21) Appl. No.: 15/084,586

(22) Filed: Mar. 30, 2016

(65) Prior Publication Data
US 2016/0288084 A1  Oct. 6, 2016

(30) Foreign Application Priority Data
Mar. 31, 2015  (JP) .................. 2015-073179

(51) Int. Cl.
| | |
|---|---|
| *C02F 1/28* | (2006.01) |
| *B01J 20/04* | (2006.01) |
| *B01J 20/02* | (2006.01) |
| *B01J 20/30* | (2006.01) |
| *B09C 1/08* | (2006.01) |
| *C02F 101/14* | (2006.01) |
| *C02F 101/20* | (2006.01) |
| *C02F 101/10* | (2006.01) |

(52) U.S. Cl.
CPC ......... *B01J 20/043* (2013.01); *B01J 20/0266* (2013.01); *B01J 20/3078* (2013.01); *B09C 1/08* (2013.01); *C02F 1/281* (2013.01); *C02F 2101/103* (2013.01); *C02F 2101/14* (2013.01); *C02F 2101/20* (2013.01); *Y02W 10/37* (2015.05)

(58) Field of Classification Search
None
See application file for complete search history.

(56) References Cited

U.S. PATENT DOCUMENTS

| | | | | |
|---|---|---|---|---|
| 4,132,558 | A * | 1/1979 | Uchikawa ............. | C02F 11/008 106/696 |
| 6,113,684 | A * | 9/2000 | Kunbargi ................. | C04B 7/32 106/692 |

(Continued)

FOREIGN PATENT DOCUMENTS

| | | |
|---|---|---|
| JP | 2007-076931 A1 | 3/2007 |
| JP | 2008080223 A | 4/2008 |

(Continued)

*Primary Examiner* — Chester T Barry
(74) *Attorney, Agent, or Firm* — Taft Stettinius & Hollister LLP

(57) ABSTRACT

A dolomite-based adsorbent for heavy metal, halogen and metalloid is half-fired dolomite, and a content of a residual $CaMg(CO_3)_2$ phase in the half-fired dolomite, which is analyzed using a Rietveld method by means of powder X-ray diffraction, is $0.4 \leq x \leq 35.4$ (wt %), and preferably, the dolomite-based absorbent for heavy metal, halogen and metalloid further comprises ferrous sulfate.

7 Claims, 3 Drawing Sheets

(56) References Cited

U.S. PATENT DOCUMENTS

| | | | | |
|---|---|---|---|---|
| 6,200,381 B1* | 3/2001 | Rechichi | ................ | C04B 2/102 106/801 |
| 2016/0288084 A1* | 10/2016 | Itaya | ................ | B01J 20/043 |
| 2016/0288085 A1* | 10/2016 | Itaya | ................ | B01J 20/043 |

FOREIGN PATENT DOCUMENTS

| | | | |
|---|---|---|---|
| JP | 2010214254 | A | 9/2010 |
| JP | 2011240325 | A | 12/2011 |
| JP | 2012157834 | A | 8/2012 |
| JP | 2013-031796 | A1 | 2/2013 |

* cited by examiner

DOLOMITE-BASED HEAVY METAL ADSORBENT, PREPARATION, AND USE FOR ADSORBING HEAVY METAL, HALOGEN AND METALLOID

CROSS-REFERENCE TO RELATED APPLICATIONS

This application claims the benefit of Japanese Patent Application No. 2015-073179 filed Mar. 31, 2015, the disclosure of which is herein incorporated by reference in its entirety.

BACKGROUND OF THE INVENTION

Field of the Invention

The present invention relates to a dolomite-based adsorbent for heavy metal, halogen and metalloid, a method for preparing thereof, a method for controlling a quality thereof, and a method for adsorbing heavy metal, halogen, and metalloid, and particularly to a dolomite-based adsorbent which shows an enhanced adsorption ability of heavy metal, halogen, and metalloid, a method for preparing thereof, a method for controlling a quality thereof, and a method for adsorbing heavy metal, halogen, and metalloid.

Related Art

As an agent used as an insolubilization material of heavy metal, halogen and metalloid in a drainage treatment and in soils, sodium sulfate, ferric chloride, ferrous sulfate, magnesium oxide, a titanium salt, a cerium salt, a chelating agent, hydrotalcite, schwertmannite, and the like are known, but these agents have problems of a low insolubilization effect, a low coping ability with combined contamination, a high cost, unstable procurement, and the like.

In consideration of the above problems, as an insolubilization material, a dolomite-based adsorbent of half-fired dolomite, calcined dolomite, partially decomposed dolomite, or the like is proposed, and, for example, the following dolomite materials are disclosed.

Japanese Laid-open Patent Publication No. 2012-157834A (Patent Document 1) discloses a remover of fluorine and/or heavy metal ions in waste water which is obtained by firing dolomite and is made of a blend of half-fired dolomite having a content of free calcium oxide of 1.2% by weight or lower and a content of free magnesium oxide of 8% by weight or higher and a water-soluble iron compound.

In addition, Japanese Laid-open Patent Publication No. 2011-240325A (Patent Document 2) discloses a remover of heavy metal ions and(/or) phosphoric acid ions in waste water which is obtained by firing dolomite and includes as an effective component half-fired dolomite having a content of free calcium oxide of 1.2% by weight or lower and a content of free magnesium oxide of 8% by weight or higher.

Japanese Laid-open Patent Publication No. 2010-214254A (Patent Document 3) discloses a heavy metal elution-suppressing material including half-fired dolomite obtained by half-firing dolomite for which the half-firing is carried out under firing conditions in which magnesium carbonate in dolomite is decarboxylated and calcium carbonate in dolomite is not decarboxylated at a specific carbon dioxide partial pressure and in which the half-fired dolomite includes magnesium oxide and calcium carbonate.

Japanese Laid-open Patent Publication No. 2008-80223A (Patent Document 4) discloses a fluoride ion-trapping material for which dolomite is heated at a temperature in a range of 600° C. to 880° C. and in which the content of an undecomposed carbon dioxide component is in a range of 1.5% by weight to 47% by weight.

However, for the above dolomite materials of the related art, the regulations regarding fired dolomite serve as indirect indexes of the amount of the undecomposed carbon dioxide component, free calcium oxide, magnesium, or the like, and, in a case in which the amount of a dolomite phase in a dolomite mineral as a starting material is significantly small, there are cases in which the content of free magnesium oxide is not satisfied or, when a raw material is used, the amount of the undecomposed carbon dioxide component changes, and the regulations may become inapplicable depending on the dolomite mineral as the starting material.

Furthermore, in Japanese Laid-open Patent Publication No. 2010-214254A, dolomite is fired after the carbon dioxide partial pressure is adjusted to be in a specific range, and thus there is a problem of an increase in facility investment or production costs unless a special firing furnace is used.

Meanwhile, when dolomite is fired, thermal decomposition represented by the following formula is caused and thus dolomite has adsorption property of heavy metal and the like.

$$CaMg(CO_3)_2 \rightarrow MgO + CaCO_3 + CO_2 \quad (1)$$

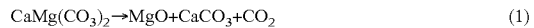

When dolomite is fired, a dolomite phase ($CaMg(CO_3)_2$ phase), a MgO phase, and a $CaCO_3$ phase coexist in half-fired dolomite, and insolubilization property, adsorption property, and elution-suppressing property with respect to a variety of heavy metal and the like vary depending on the content proportions of these crystal phases.

In addition, since the dolomite mineral as a raw material is generally produced in a biphase mixture state of a dolomite phase and a calcium carbonate phase and the content ratio of the dolomite phase significantly varies depending on localities, there is a problem in that appropriate firing conditions vary depending on raw materials.

Furthermore, while the degree of firing of mineral that is thermally decomposed is generally measured by thermo-gravity-differential scanning calorimeter (TG-DSC), in the case of dolomite, two peaks of Ca portion and Mg portion overlap with each other, and thus the above method is not suitable for determining the amounts of each component in fired dolomite.

SUMMARY OF THE INVENTION

An object of the present invention is to solve the above problems and provide a dolomite-based adsorbent for heavy metal, halogen and metalloid, which is half-fired dolomite having an excellent adsorption removal ratio of heavy metal, halogen and metalloid regardless of the difference in composition caused by the difference in localities of a dolomite mineral as a raw material, and setting of firing conditions such as temperature, and the like.

In addition, another object of the present invention is to provide a method for preparing a dolomite-based adsorbent for heavy metal, halogen and metalloid in order to obtain the dolomite-based adsorbent of the present invention having excellent adsorption properties for heavy metal, halogen and metalloid so that the dolomite shows effective adsorption removal ratio of heavy metal, halogen and metalloid regardless of the difference in composition caused by the difference in localities of a dolomite mineral as a raw material, and setting of firing conditions such as temperature, and the like.

In addition, still another object of the present invention is to provide a method for controlling a dolomite-based adsorbent having an excellent adsorption properties for heavy metal, halogen and metalloid with which quality of dolomite is controlled so that dolomite shows effective adsorption removal ratio of heavy metal, halogen and metalloid regardless of the difference in composition caused by the difference in localities of a dolomite mineral as a raw material, and setting of firing conditions such as temperature, and the like.

In addition, still another object of the present invention is to provide a method for effectively adsorbing heavy metal, halogen, and metalloid.

The present invention is achieved by finding that there is a close relationship between the content of a dolomite phase remaining in a dolomite fired material and the adsorption removal ratio of heavy metal, halogen and metalloid and analyzing and determining the residual amount of the dolomite phase in the dolomite fired substance by a specific diffraction method.

That is, a dolomite-based adsorbent of the present invention is a dolomite-based adsorbent for heavy metal, halogen and metalloid that is half-fired dolomite, in which a content of a residual $CaMg(CO_3)_2$ phase in the half-fired dolomite, which is analyzed using a Rietveld method by means of powder X-ray diffraction, is 0.4≤x≤35.4 (wt %).

Preferably, the dolomite-based adsorbent for heavy metal, halogen and metalloid of the present invention further comprises ferrous sulfate.

In addition, a method for preparing a dolomite-based adsorbent for heavy metal, halogen and metalloid of the present invention comprises firing dolomite so that a content of a residual $CaMg(CO_3)_2$ phase in the obtained dolomite-based material, which is analyzed using a Rietveld method by means of powder X-ray diffraction, is 0.4≤x≤35.4 (wt %).

Preferably, the method for preparing a dolomite-based adsorbent for heavy metal, halogen and metalloid of the present invention further comprises blending ferrous sulfate in the obtained dolomite-material.

A method for controlling a quality of a dolomite-based adsorbent for heavy metal, halogen and metalloid of the present invention comprises adjusting the residual $CaMg(CO_3)_2$ phase in the obtained dolomite-based material by firing dolomite so that a content of residual $CaMg(CO_3)_2$ phase in the obtained dolomite-based material, which is analyzed using a Rietveld method by means of powder X-ray diffraction of the dolomite fired material, is 0.4≤x≤35.4 (wt %).

A method for adsorbing heavy metal, halogen and metalloid comprises using the dolomite-based adsorbent of the present inventions.

In the present invention, due to the finding that there is a close relationship between the adsorption removal ratio of heavy metal, halogen and metalloid and the content of a residual dolomite phase in a dolomite fired material, the dolomite-based adsorbent of the present invention can have excellent adsorption properties for heavy metal, halogen and metalloid regardless of the difference in composition caused by the difference in localities of a dolomite mineral as a raw material, and setting of firing conditions such as the firing temperature, and the like by specifying the content of a residual dolomite phase in half-fired dolomite and becomes capable of effectively exhibiting the heavy metal, halogen and metalloid adsorption properties of dolomite.

In addition, it becomes possible to facilitate quality control which maintains the adsorbing properties of dolomite so that the adsorption properties for heavy metal, halogen and metalloid of dolomite can be effectively exhibited.

In addition, the method for preparing a dolomite-based adsorbent for heavy metal, halogen and metalloid of the present invention enables appropriate production of a dolomite-based adsorbent for heavy metal, halogen and metalloid which is half-fired dolomite having excellent adsorption properties for heavy metal, halogen and metalloid of the present invention without any need of a special apparatus or the like.

The method for adsorbing heavy metal, halogen, and metalloid of the present invention enables effective removal of heavy metal, halogen and metalloid in soils or waste water.

DETAILED DESCRIPTION OF THE INVENTION

Figure 1:
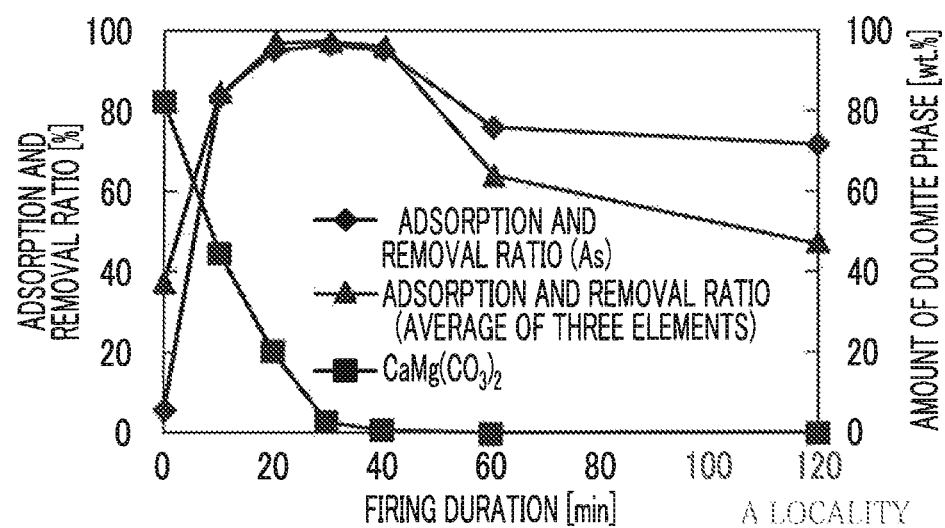
FIG. 1 is a line graph illustrating contents of a residual dolomite phase and an adsorption removal ratio of heavy metal, halogen and metalloid in a fired-dolomite material which is an example of a dolomite-based heavy metal adsorbent.

The present invention will be described using the following preferred examples, but is not limited thereto.

A dolomite-based adsorbent for heavy metal halogen and metalloid of the present invention is an adsorbent that is half-fired dolomite, in which the content of a residual $CaMg(CO_3)_2$ phase in the half-fired dolomite, which is analyzed using the Rietveld method by means of powder X-ray diffraction, is 0.4≤x≤35.4 (wt %).

Here, the substances that can be adsorbed and removed are heavy metal, halogen, and metalloid. The heavy metal can be exemplified by one or more of chromium, lead, cadmium, and the like, and the halogen can be exemplified by chlorine, fluorine, and the like, and metalloid can be exemplified by one or more of arsenic, boron and the like but the heavy metal, halogen, and metalloid are not limited thereto.

Since there is a close relationship between the content of a residual dolomite phase in fired dolomite and the adsorption removal ratio of heavy metal, halogen and metalloid, the present invention enables dolomite to have most excellent adsorption properties for heavy metal, halogen and metalloid regardless of the difference in composition caused by the difference in localities of a dolomite mineral as a raw material, setting of firing conditions such as the firing temperature, and the like by determining the amount of a $CaMg(CO_3)_2$ phase in the half-fired dolomite and adjusting the amount to be a residual amount in the above specific range.

Any of raw dolomite material can be used as raw dolomite material in the present invention, and the locality or the composition of the raw material dolomite does not matter.

Dolomite has a double salt structure in which the molar ratio between limestone ($CaCO_3$) and magnesite ($MgCO_3$) reaches 1:1, $Ca^{2+}$ ions and $Mg^{2+}$ ions form layers with each other with a $CO_3^{2-}$ group therebetween, and, generally, the proportion of magnesium carbonate is in a range of 10 wt % to 45 wt %. Since a large amount of dolomite is present in Japan, an absorbent for heavy metal, halogen and metalloid is prepared using the dolomite is also advantageous in views of costs or environmental load.

When dolomite is fired, a decomposition reaction represented by the following formula is caused:

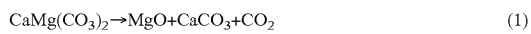
$$CaMg(CO_3)_2 \rightarrow MgO + CaCO_3 + CO_2 \quad (1)$$

It is considered that the thermal decomposition of dolomite by means of firing forms fine pores and adsorption properties for heavy metal, halogen and metalloid is exhibited.

In the present invention, half-fired dolomite in which the content of a residual $CaMg(CO_3)_2$ phase in the half-fired dolomite obtained by firing dolomite, which is analyzed using the Rietveld method by means of powder X-ray diffraction, is 0.4≤x≤35.4 (wt %) and preferably 1.8≤x≤17.4 (wt %), the dolomite can have excellent adsorption properties for heavy metal, halogen and metalloid.

In a case in which the content of the residual $CaMg(CO_3)_2$ phase is smaller than 0.4 wt % or larger than 35.4 wt %, the adsorption properties for heavy metal, halogen and metalloid of the dolomite is small.

Unlike a TG-DSC method, the powder X-ray diffraction method is capable of accurately analyzing the amounts of a $CaMg(CO_3)_2$ phase, a $CaCO_3$ phase, and a MgO phase in the half-fired dolomite, and thus it becomes possible to accurately determine the amount of the residual $CaMg(CO_3)_2$ phase in the half-fired dolomite.

The present dolomite-based adsorbent invention, preferably, further comprises a ferrous compound, examples of which include ferrous sulfate and ferrous chloride.

Regarding the blended amount of the ferrous composition, the weight ratio between the ferrous composition and half-fired dolomite in which the content of the residual $CaMg(CO_3)_2$ phase is 0.4≤x≤35.4 (wt %) is in a range of 5:5 to 9:1 and preferably 9:1.

When the absorbent includes the ferrous composition, high adsorption properties for heavy metal, halogen and metalloid are also obtained. Due to its reduction action, it is possible to more effectively insolubilize heavy metal, halogen and metalloid, and it becomes possible to remove heave metal, halogen and metalloid from contaminated waste water or contaminated soils.

In addition, in the method for preparing a dolomite-based adsorbent for heavy metal, halogen and metalloid of the present invention, dolomite is fired so that the content of the residual $CaMg(CO_3)_2$ phase in the obtained dolomite-based material, which is analyzed using the Rietveld method by means of powder X-ray diffraction, is 0.4≤x≤35.4 (wt %).

The temperature at which dolomite is fired is not particularly limited, and dolomite can be fired at an ordinary temperature at which dolomite is fired so as to prepare half-fired dolomite, for example, a temperature in a range of 650° C. to 1000° C. The firing duration is also not limited as long as dolomite is fired so that the content of the residual $CaMg(CO_3)_2$ phase is 0.4≤x≤35.4 (wt %).

In a process of firing dolomite, when half-fired dolomite is selected at a point in time at which the content of the residual $CaMg(CO_3)_2$ phase is 0.4≤x≤35.4 (wt %), the dolomite-based adsorbent for heavy metal, halogen and metalloid of the present invention can be obtained.

In addition, when the content of the residual $CaMg(CO_3)_2$ phase in the fired-dolomite material analyzed using the Rietveld method by means of powder X-ray diffraction of the fired-dolomite material is adjusted to 0.4≤x≤35.4 (wt %), it is possible to facilitate quality control so that dolomite has excellent adsorption properties for heavy metal, halogen and metalloid.

When the dolomite-based heavy metal adsorbent of the present invention is brought into contact with contaminated soils or contaminated waste water, it is possible to adsorb and remove heavy metal, halogen and metalloid in the contaminated soils or the contaminated waste water.

As a contact method, a well-known arbitrary method is applicable, and examples thereof include mixing of the dolomite-based adsorbent for heavy metal, halogen and metalloid of the present invention and soils and a method in which the dolomite-based adsorbent for heavy metal, halogen and metalloid of the present invention is added into and stirred with waste water. In addition, in a case in which the dolomite-based adsorbent for heavy metal, halogen and metalloid of the present invention is added into contaminated waste water, it is also possible to collect heavy metal, halogen and metalloid by adding an agglomerating agent and conducting solid-liquid separation.

EXAMPLES

The present invention will be described by the following examples and comparative examples.

Six kinds of dolomite from different A to F localities were fired at 800° C. in the air for 10 minutes to 120 minutes, and, during that period, a fired-dolomite material was obtained every 10 minutes from the beginning of the firing. For the respective fired-dolomite materials, the contents of a residual $CaMg(CO_3)_2$ phase in the respective fired-dolomite materials were analyzed by the powder X-ray diffraction Rietveld method under the below conditions.

Figure 2:
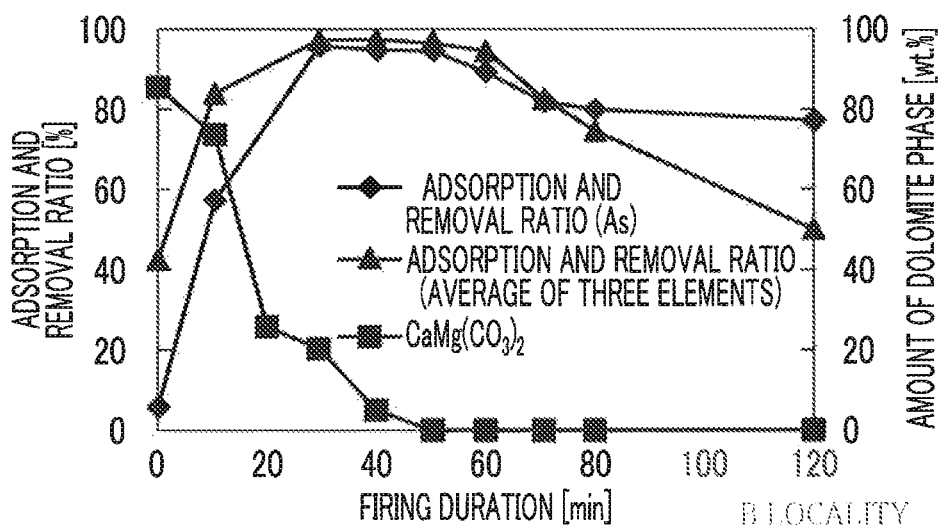
FIG. 2 is a line graph illustrating contents of a residual dolomite phase and an adsorption removal ratio of heavy metal, halogen and metalloid in a fired-dolomite material which is another example of a dolomite-based heavy metal adsorbent.
Figure 3:
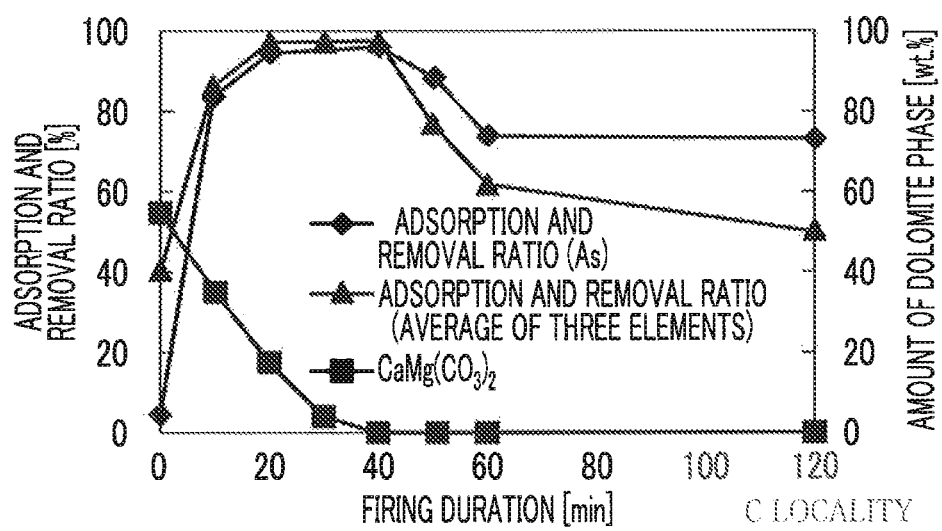
FIG. 3 is a line graph illustrating contents of a residual dolomite phase and an adsorption removal ratio of heavy metal, halogen and metalloid in a fired-dolomite material which is still another example of a dolomite-based heavy metal adsorbent.
Figure 4:
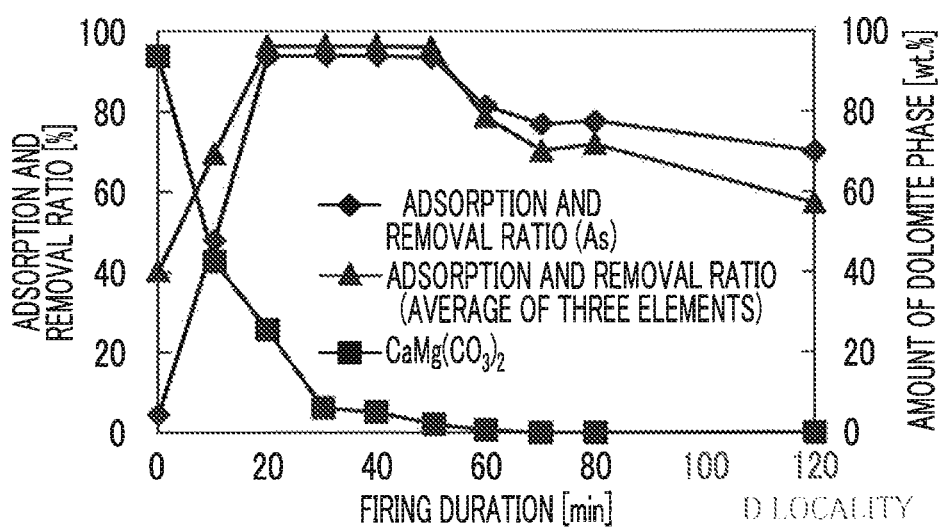
FIG. 4 is a line graph illustrating contents of a residual dolomite phase and an adsorption removal ratio of heavy metal, halogen and metalloid in a fired-dolomite material which is still another example of a dolomite-based heavy metal adsorbent.
Figure 5:
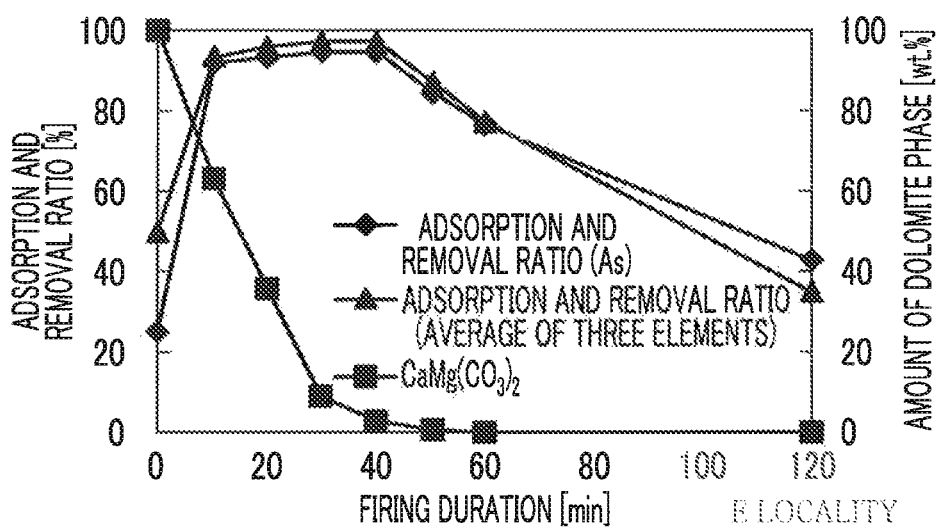
FIG. 5 is a line graph illustrating contents of a residual dolomite phase and an adsorption removal ratio of heavy metal, halogen and metalloid in a fired-dolomite material which is still another example of a dolomite-based heavy metal adsorbent.
Figure 6:
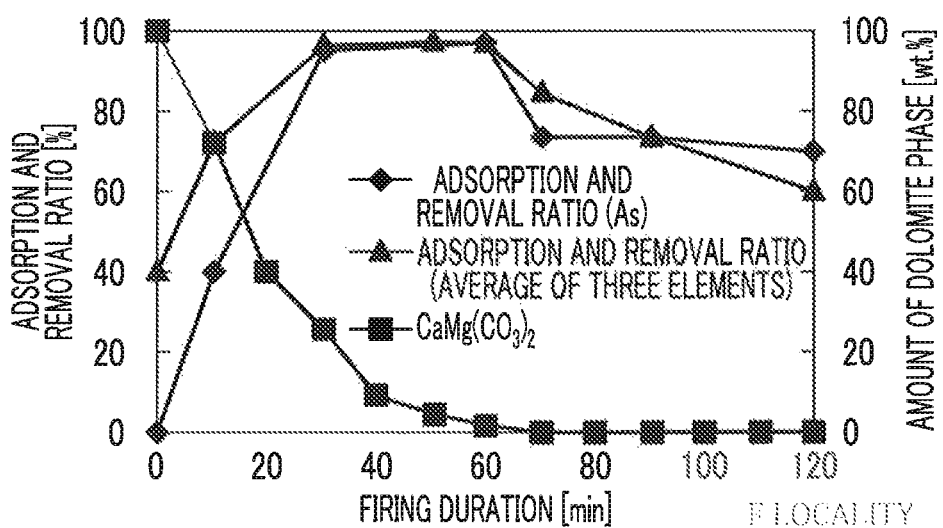
FIG. 6 is a line graph illustrating contents of a residual dolomite phase and an adsorption removal ratio of heavy metal, halogen and metalloid in a fired-dolomite material which is still another example of a dolomite-based heavy metal adsorbent.

The results are respectively shown in Tables 1 to 6 and FIGS. 1 to 6 (dolomite from the A locality is in Table 1 and FIG. 1; dolomite from the B locality is in Table 2 and FIG. 2; dolomite from the C locality is in Table 3 and FIG. 3; dolomite from the D locality is in Table 4 and FIG. 4; dolomite from the E locality is in Table 5 and FIG. 5; dolomite from the F locality is in Table 6 and FIG. 6).

TABLE 1

Amount determination results of individual phases by means of Rietveld analysis (wt. %)

| Firing duration [min] | CaMg(CO₃)₂ | CaCO₃ | MgO | CaO | Ca(OH)₂ | SiO₂ |
|---|---|---|---|---|---|---|
| 0 | 82.5 | 17.5 | 0 | 0 | 0 | 0 |
| 10 | 44.6 | 55.6 | 0 | 0 | 0 | 0 |
| 20 | 19.4 | 63.8 | 16.8 | 0 | 0 | 0 |
| 30 | 2.6 | 76.5 | 20.9 | 0 | 0 | 0 |
| 40 | 0.5 | 77.0 | 22.5 | 0 | 0 | 0 |
| 60 | 0.1 | 80.7 | 17.9 | 1.1 | 0.1 | 0 |
| 120 | 0 | 66.9 | 28.2 | 3.9 | 1.0 | 0 |

TABLE 2

Amount determination results of individual phases by means of Rietveld analysis (wt. %)

| Firing duration [min] | CaMg(CO₃)₂ | CaCO₃ | MgO | CaO | SiO₂ |
|---|---|---|---|---|---|
| 0 | 85.9 | 11.7 | 0 | 0 | 2.3 |
| 10 | 73.2 | 24.6 | 0 | 0 | 2.2 |
| 20 | 26.9 | 64.5 | 5.0 | 0 | 3.7 |
| 30 | 21.5 | 70.1 | 5.6 | 0 | 2.8 |
| 40 | 4.5 | 79.6 | 12.2 | 0 | 3.6 |
| 50 | 0.5 | 81.9 | 13.1 | 0 | 4.6 |
| 60 | 0.3 | 80.2 | 15.3 | 0.3 | 4.0 |
| 70 | 0 | 75.0 | 20.1 | 1.1 | 3.8 |
| 80 | 0 | 71.7 | 20.4 | 3.3 | 4.6 |
| 120 | 0 | 68.3 | 20.2 | 7.9 | 3.7 |

TABLE 3

Amount determination results of individual phases by means of Rietveld analysis (wt. %)

| Firing duration [min] | CaMg(CO₃)₂ | CaCO₃ | MgO | CaO | SiO₂ |
|---|---|---|---|---|---|
| 0 | 54.3 | 44.3 | 0 | 0 | 1.4 |
| 10 | 36.0 | 55.8 | 0 | 0 | 1.3 |
| 20 | 17.4 | 74.3 | 7.2 | 0 | 1.0 |
| 30 | 4.4 | 86.5 | 7.9 | 0 | 1.2 |
| 40 | 0.4 | 83.5 | 14.6 | 0 | 1.5 |
| 50 | 0 | 81.6 | 15.8 | 0.8 | 1.8 |
| 60 | 0 | 83.3 | 12.3 | 2.4 | 2.0 |
| 120 | 0 | 61.6 | 12.7 | 24.0 | 1.6 |

TABLE 4

Amount determination results of individual phases by means of Rietveld analysis (wt. %)

| Firing duration [min] | CaMg(CO₃)₂ | CaCO₃ | MgO | CaO | SiO₂ |
|---|---|---|---|---|---|
| 0 | 93.9 | 5.9 | 0 | 0 | 0.2 |
| 10 | 44.1 | 48.3 | 7.4 | 0 | 0.2 |
| 20 | 27.5 | 60.9 | 11.3 | 0 | 0.3 |
| 30 | 5.9 | 80.3 | 13.5 | 0 | 0.3 |
| 40 | 4.5 | 81.9 | 13.3 | 0 | 0.3 |
| 50 | 1.1 | 84.7 | 13.9 | 0 | 0.3 |
| 60 | 0.6 | 84.2 | 14.9 | 0 | 0.3 |
| 70 | 0 | 76.5 | 21.7 | 1.6 | 0.1 |
| 80 | 0 | 76.9 | 19.5 | 3.3 | 0.3 |
| 120 | 0 | 61.8 | 21.9 | 16.1 | 0.1 |

TABLE 5

Amount determination results of individual phases by means of Rietveld analysis (wt. %)

| Firing duration [min] | CaMg(CO₃)₂ | CaCO₃ | MgO | CaO | SiO₂ |
|---|---|---|---|---|---|
| 0 | 100 | 0 | 0 | 0 | 0 |
| 10 | 63.5 | 32.0 | 4.4 | 0 | 0 |
| 20 | 35.4 | 54.9 | 8.7 | 0 | 0 |
| 30 | 11.1 | 77.1 | 11.8 | 0 | 0 |
| 40 | 2.8 | 83.9 | 13.3 | 0 | 0 |
| 50 | 0 | 87.7 | 11.8 | 0.5 | 0 |
| 60 | 0 | 84.4 | 15.0 | 0.6 | 0 |
| 120 | 0 | 66.6 | 24.1 | 9.6 | 0 |

TABLE 6

Amount determination results of individual phases by means of Rietveld analysis (wt. %)

| Firing duration [min] | CaMg(CO₃)₂ | CaCO₃ | MgO | CaO | SiO₂ |
|---|---|---|---|---|---|
| 0 | 100 | 0 | 0 | 0 | 0 |
| 10 | 73.6 | 22.8 | 3.6 | 0 | 0 |
| 20 | 37.9 | 54.1 | 8.0 | 0 | 0 |
| 30 | 25.3 | 65.2 | 9.6 | 0 | 0 |
| 40 | 10.5 | 76.9 | 12.7 | 0 | 0 |
| 50 | 4.8 | 79.7 | 15.6 | 0 | 0 |
| 60 | 1.8 | 81.2 | 17.1 | 0 | 0 |
| 70 | 0 | 77.4 | 21.1 | 1.6 | 0 |
| 80 | 0 | 74.0 | 21.4 | 4.6 | 0 |
| 90 | 0 | 72.5 | 21.2 | 6.3 | 0 |
| 100 | 0 | 63.5 | 22.4 | 14.0 | 0 |
| 110 | 0 | 67.6 | 21.7 | 10.7 | 0 |
| 120 | 0 | 63.7 | 22.3 | 14.0 | 0 |

The measurement conditions of the powder X-ray diffraction are as described below.

Apparatus name: PANalytical X'Pert Pro MPD
Rietveld analysis software: PANalytical X'Pert High-Score Plus
Measurement Conditions
Bulb: Cu-Kα
Tube voltage: 45 kV
Current: 40 mA
Divergence slit: variable (12 mm)
Anti-Scatter slit (incidence side): none
Solar slit (incidence side): 0.04 Rad
Receiving slit: none
Anti-Scatter slit (light receiving side): variable (12 mm)
Solar slit (light receiving side): 0.04 Rad
Scanning field: 2θ=5~90°
Step scanning: 0.008°
Continuous scanning time: 0.10°/sec Each of the fired-dolomite material (1 g) was added to 100 mg of respective solutions (100 ml) containing arsenic (As), fluorine (F), or lead (Pb) (5 mg/l, respectively) which were prepared using respective reagents shown in Table 7, uniformly mixing with four-hour vibration is conducted.

TABLE 7

| Element | Reagent |
|---|---|
| As(III) | NaAsO₂ |
| F | NaF |
| Pb | Pb(NO₃)₂ |

After that, the adsorption removal ratio of arsenic in the solution and the average removal ratios of the arsenic, fluorine, and lead were calculated from the residual amounts of arsenic, fluorine, and lead remaining in the respective solutions using individual methods shown in Table 8 below, and the results are respectively shown in Tables 9 to 14 and FIGS. 1 to 6 (dolomite from the A locality is in Table 9 and FIG. 1; dolomite from the B locality is in Table 10 and FIG. 2; dolomite from the C locality is in Table 11 and FIG. 3; dolomite from the locality D is in Table 12 and FIG. 4; dolomite from the E locality is in Table 13 and FIG. 5; dolomite from the F locality is in Table 14 and FIG. 6).

Meanwhile, for lead, an ICP emission spectroscopic analysis method in the case of an analysis of an mg/l order is used, and electrothermal atomizer atomic absorption spectrometry in the case of an analysis of a μg/l order is used.

In addition, the pH and oxidation reduction potential (ORP) of a filtrate were measured using a desktop pH meter: F-73 manufactured by Horiba, Ltd. (pH electrode: 9615S-10D, ORP electrode: 9300-10D), and the results are also shown in Tables 9 to 14.

TABLE 8

| Subject element | | Analysis method |
|---|---|---|
| As | JIS K 0102-2008 61.2 | Hydride generation atomic absorption spectrometry |
| F | JIS K 0170-2011 6 | Lanthanum/Alizarin Complexone method |
| Pb | JIS K 0102-2008 54.2 | Electrothermal atomizer atomic absorption spectrometry |
|  | JIS K 0102-2008 54.3 | ICP emission spectroscopic analysis method |

TABLE 9

Adsorption test

| Firing duration | Adsorption removal ratio [%] | | | | Properties of filtrate | |
|---|---|---|---|---|---|---|
| [min] | As(III) | F | Pb | Average | pH | ORP [mV] |
| 0 | 5.7 | 9.8 | 97.9 | 37.8 | 8.0 | 280 |
| 10 | 83.4 | 83.1 | 86.9 | 84.5 | 9.4 | 190 |
| 20 | 95.6 | 97.9 | 97.8 | 97.1 | 10.8 | 202 |
| 30 | 96.0 | 97.9 | 99.6 | 97.8 | 10.8 | 204 |
| 40 | 95.1 | 95.8 | 97.9 | 96.3 | 11.2 | 180 |
| 60 | 76.5 | 35.1 | 80.0 | 63.9 | 12.0 | 92 |
| 120 | 72.1 | 29.5 | 41.2 | 47.6 | 12.3 | 42 |

TABLE 10

Adsorption test

| Firing duration | Adsorption removal ratio [%] | | | | Properties of filtrate | |
|---|---|---|---|---|---|---|
| [min] | As(III) | F | Pb | Average | pH | ORP [mV] |
| 0 | 7.4 | 21.3 | 99.6 | 42.8 | 8.8 | 276 |
| 10 | 56.7 | 96.0 | 99.6 | 84.1 | 9.1 | 249 |
| 30 | 95.7 | 96.2 | 99.6 | 97.2 | 10.5 | 213 |
| 40 | 95.0 | 97.2 | 99.6 | 97.3 | 10.7 | 207 |
| 50 | 95.7 | 96.4 | 99.6 | 97.2 | 10.9 | 201 |
| 60 | 89.0 | 93.2 | 99.5 | 93.9 | 11.4 | 171 |
| 70 | 81.5 | 68.5 | 95.3 | 81.8 | 12.0 | 118 |
| 80 | 78.8 | 60.9 | 84.4 | 74.7 | 12.3 | 94 |
| 120 | 77.5 | 13.7 | 56.7 | 49.3 | 12.6 | 71 |

TABLE 11

Adsorption test

| Firing duration | Adsorption removal ratio [%] | | | | Properties of filtrate | |
|---|---|---|---|---|---|---|
| [min] | As(III) | F | Pb | Average | pH | ORP [mV] |
| 0 | 5.7 | 19.0 | 97.9 | 40.8 | 9.2 | 279 |
| 10 | 83.4 | 77.6 | 97.9 | 86.3 | 10.8 | 196 |
| 20 | 95.6 | 96.9 | 99.6 | 97.4 | 10.9 | 197 |
| 30 | 96.4 | 96.6 | 99.6 | 97.5 | 11.0 | 197 |
| 40 | 95.1 | 91.4 | 99.6 | 95.4 | 11.3 | 186 |
| 50 | 87.7 | 54.9 | 90.5 | 77.7 | 11.9 | 142 |
| 60 | 76.5 | 35.1 | 72.8 | 61.5 | 12.6 | 97 |
| 120 | 72.1 | 29.5 | 50.5 | 50.7 | 12.1 | 58 |

TABLE 12

Adsorption test

| Firing duration | Adsorption removal ratio [%] | | | | Properties of filtrate | |
|---|---|---|---|---|---|---|
| [min] | As(III) | F | Pb | Average | pH | ORP [mV] |
| 0 | 4.4 | 23.5 | 99.6 | 42.5 | 9.3 | 259 |
| 10 | 50.3 | 60.4 | 99.6 | 70.1 | 9.8 | 212 |
| 20 | 94.5 | 95.5 | 99.6 | 96.5 | 10.6 | 195 |
| 30 | 94.3 | 96.0 | 99.6 | 96.7 | 10.8 | 183 |
| 40 | 94.9 | 96.8 | 99.6 | 97.1 | 10.8 | 146 |
| 50 | 94.4 | 95.5 | 99.5 | 96.5 | 11.0 | 145 |
| 60 | 81.3 | 61.5 | 93.7 | 78.8 | 11.9 | 102 |
| 70 | 76.0 | 49.2 | 82.3 | 69.2 | 12.0 | 92 |
| 80 | 77.3 | 50.4 | 87.2 | 71.6 | 12.1 | 85 |
| 120 | 68.7 | 45.4 | 59.2 | 57.7 | 12.6 | 53 |

TABLE 13

Adsorption test

| Firing duration | Adsorption removal ratio [%] | | | | Properties of filtrate | |
|---|---|---|---|---|---|---|
| [min] | As(III) | F | Pb | Average | pH | ORP [mV] |
| 0 | 24.7 | 28.4 | 99.6 | 50.9 | 10.1 | 216 |
| 10 | 92.4 | 89.7 | 99.6 | 93.9 | 10.8 | 193 |
| 20 | 95.2 | 94.1 | 99.6 | 96.3 | 10.9 | 192 |
| 30 | 96.0 | 96.4 | 99.6 | 97.3 | 10.9 | 187 |
| 40 | 95.7 | 96.4 | 99.6 | 97.2 | 10.9 | 189 |
| 50 | 84.4 | 79.4 | 99.6 | 87.8 | 11.4 | 152 |
| 60 | 77.6 | 57.9 | 99.6 | 78.4 | 11.6 | 132 |
| 120 | 42.3 | 12.9 | 44.1 | 33.1 | 12.6 | 52 |

TABLE 14

Adsorption test

| Firing duration | Adsorption removal ratio [%] | | | | Properties of filtrate | |
|---|---|---|---|---|---|---|
| [min] | As(III) | F | Pb | Average | pH | ORP [mV] |
| 0 | 0.2 | 20.3 | 99.1 | 39.9 | 9.4 | 243 |
| 10 | 40.3 | 76.7 | 99.4 | 72.1 | 9.7 | 215 |
| 30 | 96.0 | 98.4 | 99.6 | 98.0 | 10.6 | 194 |
| 50 | 98.0 | 97.3 | 99.6 | 98.3 | 10.4 | 212 |
| 60 | 98.0 | 98.9 | 99.6 | 98.8 | 10.6 | 203 |
| 70 | 73.3 | 84.9 | 97.7 | 85.3 | 11.7 | 125 |
| 90 | 73.1 | 66.9 | 81.2 | 73.8 | 12.3 | 89 |
| 120 | 70.9 | 59.4 | 50.8 | 60.4 | 12.5 | 73 |

From FIGS. 1 to 6 and the tables, it is found that, in an absorbent in which the adsorption removal ratio of heavy metal, halogen and metalloid is as high as 95% or higher, the content of the residual $CaMg(CO_3)_2$ phase remaining in the half-fired dolomite is $0.4 \leq x \leq 35.4$ (wt %) regardless of the localities of dolomite.

In addition, 100 ml of respective solutions containing 5 mg/l and 100 mg/l of arsenic (As) were prepared using the reagents shown in Table 7. Uniform mixtures obtained by adding 1 g of half-fired dolomite in Table 1 in which the content of the dolomite ($CaMg(CO_3)_2$) phase remaining in the half-fired dolomite is 2.6 wt % to the above solutions respectively by four-hour vibration and uniform mixtures obtained by adding 0.9 g of the half-fired dolomite and 0.1 g of ferrous sulfate to the solutions respectively by four-hour vibration were prepared. After that, the respective solutions were separated into solid and liquid, the amounts of residual arsenic in filtrates were measured by the method shown in Table 8, and respective arsenic adsorption removal ratios (%) were calculated. The results are shown in Table 15.

In addition, the pH and oxidation reduction potential (ORP) of the filtrates were measured using a desktop pH meter: F-73 manufactured by Horiba, Ltd. (pH electrode: 9615S-10D, ORP electrode: 9300-10D), and the results are also shown in Table 15.

TABLE 15

| | | | Properties of filtrate | |
|---|---|---|---|---|
| | As 5 mg/l | As 100 mg/l | pH | ORP [mv] |
| Half-fired dolomite | 95 | 95.6 | 11.6 | 200 ± 10 |
| Half-fired dolomite + ferrous sulfate | 99.4 | 97.2 | 10.6 | 250 ± 10 |

From the table, it is found that, when ferrous sulfate is added to the half-fired dolomite of the present invention in which the content of the residual dolomite ($CaMg(CO_3)_2$) phase is $0.4 \leq x \leq 35.4$ (wt %), the adsorption removal ratio of heavy metal, halogen and metalloid further increases.

The present invention is capable of easily providing a dolomite-based heavy metal adsorbent having an excellent heavy metal adsorption removal ratio regardless of localities or the composition of raw dolomite material and thus can be applied to efficiently adsorb and remove harmful heavy metal, halogen and metalloid in waste water or soils, and, for example, can be effectively applied to a treatment of a large amount of contaminated soils containing heavy metal, halogen and metalloid generated due to an excavation work and a construction work for tunnels or dams or a treatment of waste water containing heavy metal, halogen and metalloid from plants and factories.

What is claimed is:

1. A dolomite-based adsorbent for heavy metal, halogen and metalloid,
    wherein the dolomite-based absorbent comprises half-fired dolomite and a ferrous compound, and
    a content of a residual $CaMg(CO_3)_2$ phase in the half-fired dolomite, which is analyzed using a Rietveld method by means of powder X-ray diffraction, is $0.4 \leq x \leq 35.4$ (wt %).

2. The dolomite-based adsorbent for heavy metal, halogen and metalloid according to claim 1,
    wherein the ferrous compound is selected from the group consisting of ferrous chloride and ferrous sulfate.

3. A method for preparing a dolomite-based adsorbent for heavy metal, halogen and metalloid, comprising:
    firing dolomite so that a content of a residual $CaMg(CO_3)_2$ phase in the obtained dolomite material, which is analyzed using a Rietveld method by means of powder X-ray diffraction, is $0.4 \leq x \leq 35.4$ (wt %), and
    blending ferrous compound in the obtained dolomite material.

4. The method for preparing a dolomite-based adsorbent for heavy metal, halogen and metalloid according to claim 3,
    wherein the ferrous compound is selected from the group consisting of ferrous chloride and ferrous sulfate.

5. A method for controlling a quality of a dolomite-based adsorbent containing half-fired dolomite and a ferrous compound for heavy metal, halogen and metalloid, comprising:
    adjusting a residual amount of a residual $CaMg(CO_3)_2$ phase in the obtained dolomite-based material by firing dolomite so that a content of the residual $CaMg(CO_3)_2$ phase in the obtained half-fired dolomite material, which is analyzed using a Rietveld method by means of powder X-ray diffraction, is $0.4 \leq x \leq 35.4$ (wt %), is obtained.

6. A method for adsorbing heavy metal, halogen and metalloid, comprising:
    using the dolomite-based adsorbent for heavy metal, halogen and metalloid according to claim 1.

7. A method for adsorbing heavy metal, halogen and metalloid, comprising:
    using the dolomite-based adsorbent for heavy metal, halogen and metalloid according to claim 2.

* * * * *